United States Patent Office 2,945,907
Patented July 19, 1960

2,945,907

OLEFIN CONVERSION PROCESS

Harmon M. Knight and Earl V. Kirkland, La Marque, Tex., assignors to The American Oil Company, Texas City, Tex., a corporation of Texas No Drawing. Filed Dec. 12, 1958, Ser. No. 779,855

6 Claims. (Cl. 260—683.44)

This invention relates to the reactions of olefins. More particularly it relates to the alkylation of ethylene and isoparaffins.

In the petroleum industry today, the octane race has placed a strain on facilities and materials needed to make gasoline meeting present day automotive engine requirements. One of the remaining sources of high octane components is the product of the alkylation of isobutane and ethylene. This alkylation is not easy to carry out, particularly on a large scale.

An object of the invention is the alkylation of isoparaffins, particularly isobutane, with olefins, particularly ethylene. Other objects will become apparent in the course of the detailed description.

The alkylation of isoparaffins with olefins is carried out in the presence of a novel catalyst pair. One member of the catalyst pair is boron trifluoride. The other member of the catalyst pair is a solid gel alumina containing between about 5 and 100 weight percent of zinc or copper fluoborate, based on alumina. The defined solid member has slight catalytic power in the absence of free $BF_3$.

Boron trifluoride is one member of the catalyst pair. Commercial grade anhydrous boron trifluoride is suitable for use as this member of the catalyst pair.

The other member of the catalyst pair, hereinafter spoken of as the solid member, is a gel alumina impregnated with between about 5 and 100 weight percent of zinc or copper fluoborate, calculated on the alumina component. Silica stabilized gel alumina, as described in detail in U.S. 2,398,610, and available commercially from several catalyst suppliers, is preferred.

In general, the process is carried out using an amount of catalyst sufficient to produce the desired result at the desired rate for the particular reactants. It is simplest to base calculations on the amount of alumina prior to fluoborate addition. It is usual to utilize alumina in such amount that the weight ratio of hydrocarbon charged to alumina ranges from 1:1 to 100:1. When operating with the ethylene-isobutane system, the weight ratio of hydrocarbon charged to alumina is preferably within the range 5:1 to 20:1.

The defined fluoborates are deposited on the alumina in an amount which will give the promotional effect needed for the particular reactants. Broadly, the fluoborate will be present in an amount between about 5 and 100 weight percent based on alumina. In the case of the ethylene-isobutane system, it is preferred to have the fluoborate present in an amount between about 10 and 40 weight percent, based on alumina.

The type of olefin present in the reaction zone has a considerable bearing on the amount of $BF_3$ needed to be present in the reaction zone to obtain the desired product or reaction rate. In general, the weight ratio of olefin charged to $BF_3$ introduced into the reaction zone may range from about 1:1 to 100:1. In the case of the ethylene-isobutane reaction, the olefin to $BF_3$ weight ratio is preferably between about 15:1 and 30:1.

The temperature of operation may be as low as 0° C. or even lower. Temperatures as high as 100° C. and even higher may be used. More usually the temperature of operation will be between about 20° C. and 70° C. Lower temperatures appear to favor the formation of the hydrocarbons having 6 to 7 carbon atoms. It is preferred to operate at a temperature between about 30° C. and 50° C.

Sufficient pressure is maintained on the system to keep a substantial portion of the hydrocarbons charged in the liquid state. The process may be carried out at relatively low pressures, for example, 50 p.s.i., or it may be carried out at elevated pressures, for example, 3000 p.s.i., or more. In general, pressures will be between about 100 and 2000 p.s.i. and preferably between about 500 and 1000 p.s.i.

The contacting of the isoparaffin and the olefin in the presence of the defined catalyst pair is continued until an appreciable amount of alkylate has been formed. In batch reactions, it is possible to convert substantially 100% of the olefin by a sufficiently long period of contacting. When operating in a continuous flow system, it may be desirable to have a time of contacting such that substantial amounts of olefin are not converted and obtain the complete conversion of the olefin by a recycle operation. The time of reaction will be determined by the type of hydrocarbons charged, the ratio of isoparaffin to olefin, the degree of mixing in the contacting zone and the catalyst usage. A few tests will enable one to determine the optimum time of contacting for the particular system of operating conditions being tried.

The reactants in the hydrocarbon charge to the alkylation process are isoparaffin and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. The catalyst pair is particularly effective with ethylene.

The isoparaffin reactant is defined as a paraffinic hydrocarbon which has a tertiary hydrogen atom, i.e., paraffins which have a hydrogen atom attached to a tertiary carbon atom. Examples of these are isobutane, isopentane (2-methylbutane), 2-methylpentane, 2-methylhexane, 3-methylhexane, 2,3-dimethylbutane (di-isopropyl) and 2,4-dimethylhexane. Thus the isoparaffins usable as one reactant in the process contain from 4 to 8 carbon atoms.

The alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 3 and 15.

The presence of non-reactive hydrocarbons in the hydrocarbon charge is not detrimental unless the reactants become excessively diluted. For example, the isoparaffin may also contain isomers of the normal configuration. The olefins may contain paraffins of the same carbon number. Mixtures of 2 or more isoparaffins or 2 or more olefins may be charged. In general, when a particular product distribution is desired, it is preferable to operate with a single isoparaffin and a single olefin, for example, isobutane and ethylene, both of about 95% purity.

The reactants may be mixed together before they are charged into the reactor. Or, they may be charged into the reactor separately, or a portion of the olefins may be blended with the isoparaffin before introduction into the reactor and the remainder of the olefin injected into the reactor. The charge may be introduced all at one point into the reactor or it may be introduced at two or more points. The alkylation reaction is exothermic and temperature control is facilitated by introducing the olefin into the reactor at more than one point.

The $BF_3$ may be premixed with the isoparaffin and olefin before introducing these into the reactor but this should not be done when an extremely reactive system such as isobutanes and isobutylene are being used; or when an olefin that is very rapidly polymerizable is being used. The $BF_3$ may be blended with the isoparaffin reactant and introduced into the reactor with this member when the isoparaffin and the olefins are being introduced separately. The $BF_3$ may also be introduced directly into the reaction zone independently from the hydrocarbons charged. The $BF_3$ may be introduced into the reactor at a single point or at several points to help control temperature and reaction rate.

The reactor may be a vessel providing for a batch-type reaction, i.e., one wherein the desired amount of isoparaffin and olefin are charged to a closed vessel containing the catalyst pair and the vessel then maintained at the desired temperature for the desired time. At the end of this time, the hydrocarbon product mixture and unreacted materials are withdrawn from the vessel and processed to separate the alkylate product from the unreacted materials and lower and higher molecular weight materials. The reactor may be a fixed bed type wherein the reactants and $BF_3$ are flowed through the bed of the solid member of the catalyst pair, the space velocity being controlled so that the desired amount of reaction is obtained during the passage of the reactants through the bed. Under some conditions, a moving bed may be utilized. In still another set of circumstances, a fluidized bed of the solid member may be utilized with the incoming stream of reactants providing the energy for the fluidization of the solid member. Other methods of operation common in the catalytic refining aspects of the petroleum industry utilizing solid catalysts may be readily devised.

The solid member of the catalyst system used herein may be obtained by any procedure of depositing the defined fluoborate on the alumina. The solid member may be prepared by thoroughly intermingling the alumina pellets with finely divided fluoborate. The catalyst also may be prepared by impregnating alumina with an aqueous solution of the fluoborate; the water is then removed, preferably under a vacuum to avoid decomposition of the fluoborate. It has been found that the most effective catalysts are essentially anhydrous and prepared by impregnation of the alumina with a solution of fluoborate in an organic liquid. The organic liquid is one which is inert to alumina and has a boiling point such that it may be removed from the solid member by vaporization at temperatures below about 60° C. It is to be understood that this vaporization temperature may be obtained at reduced pressures and is not related to the boiling point of the liquid at standard pressure. It is preferred to use, as the impregnating medium, an organic liquid which is essentially anhydrous, and is selected from the class of lower molecular weight aliphatic alcohols, ethers, and ketones. Examples of these preferred organic liquids are methanol, butanol, and pentanol; methyl ether, ethyl ether, and propyl ether; acetone and methyl butyl ketone. These preferred organic liquids have a very large capacity for copper fluoborate, zinc fluoborate and mercury fluoborate, and may be vaporized fairly readily at temperatures below 60° C.

An illustration of the preferred method of preparing the solid member of the catalyst system is set out:

In this example, the alumina was a silica stabilized gel alumina in the form of pellets having a 8–14 mesh size. The organic liquid was acetone. The fluoborate was zinc fluoborate dihydrate. The solubility of the zinc fluoborate dihydrate in acetone at 20° C. is approximately 60 grams per 100 milliliters. (The solubility of this salt hydrate in ethyl alcohol is about 55 grams per 100 milliliters.) The alumina and the solution were thoroughly intermingled at room temperature in a flask provided with a cooling coil. The intermingling is accompanied by a temperature rise and the cooling coil was used to maintain the temperature of the mixture below about 30° C. After all of the solution had been adsorbed by the alumina, the mixture was transferred to a drier and brought to constant weight at a temperature of about 50° C. The weight of the solid member, after constant weight had been reached, was equal to the weight of the alumina plus the weight of the zinc fluoborate dihydrate present in the solution. The solid member was analyzed for zinc and boron content; the analysis confirmed the results predicted by the weight of the solid member prepared.

The results obtainable by the process of the instant invention are set out in illustrative tests below, the results of which are set out in the table. These tests were carried out under what are more or less standard conditions, namely, a 4-liter carbon steel bomb was dried overnight in a stream of hot air at 110° C. The solid member to be tested (150 grams) was charged to the bomb in the form of 8–14 mesh particles and the bomb was evacuated. One kilogram of a dry blend of ethylene and isobutane was added and then $BF_3$ (40 grams) was pressured in. The charged bombs were placed in a rocker and allowed to rock for 20 hours. At the end of this time a liquid sample was drawn through a bomb containing activated alumina (to remove dissolved $BF_3$ and solid particles). This sample was submitted for Podbielniak distillation. A $C_6$ cut from the Podbielniak distillation was analyzed by mass spectrometer. In some cases after sampling, the remaining major portion of the product was debutanized on an Oldershaw column and then fractionated on a packed column.

All of the impregnated catalyst used in the tests reported in the table were prepared by the technique described above.

In the table, Test No. 6 shows that silica stabilized gel alumina does, in combination with $BF_3$, convert ethylene and isobutane to some extent. Test No. 1 shows that alumina, impregnated with 20 weight percent of zinc fluoborate, is ineffective for catalyzing the reaction of ethylene and isobutane, in the absence of $BF_3$. Test No. 2 shows that $BF_3$, in combination with the alumina-zinc fluoborate solid member, increased the conversion of ethylene over that of the alumina-$BF_3$ system of Test No. 6. Test No. 3 shows that cupric fluoborate on alumina, in the presence of $BF_3$, results in more alkylate at a lower olefin conversion than with the zinc fluoborate containing system. Test No. 5 shows that potassium fluoborate is not a promoter since the results of this test essentially duplicate Test No. 6 where no fluoborate was present.

Test No. 4 utilized mercuric fluoborate as the promoter. In this test, 73% of the ethylene was converted to produce an "alkylate" in an amount of 70 weight percent on ethylene charged. Inspection of this "alkylate" indicated that it is an ethylene polymer and essentially no alkylate product of ethylene-isobutane had been obtained.

It is of considerable interest that the hexane fraction in all of these tests contained 90 mole percent or more of the very much desired 2,3-dimethylbutane (di-isopropyl).

Table

| Tests | 1 | 2 | 3 | 4 | 5 | 6 |
|---|---|---|---|---|---|---|
| Activator | Zn(BF$_4$)$_2$ on Alumina | Cu(BF$_4$)$_2$ on Alumina | Cu(BF$_4$)$_2$ on Alumina | Hg(BF$_4$)$_2$ on Alumina | KBF$_4$ on Alumina | Alumina |
| Conditions: | | | | | | |
| Isobutane/Olefin (Molar) | 3.1 | 3.0 | 3.0 | 3.0 | 3.0 | 3.0 |
| Hydrocarbon/Alumina (Weight) | 25.0 | 11.2 | 11.1 | 13.6 | 11.3 | 11.1 |
| BF$_3$/Ethylene (Weight) | | 0.7 | 0.7 | 0.7 | 0.8 | 0.7 |
| Time (Hours) | 20 | 20 | 20 | 20 | 20 | 20 |
| Temperature (° C.) | 25–30 | 20–25 | 20–25 | 20–25 | 20–25 | 20–25 |
| Pressure Range (p.s.i.g.) | 230–235 | 295–168 | 321–219 | 336–226 | 304–204 | 342–245 |
| Yields (Wt. percent on C$_2$= Charged): | | | | | | |
| iC$_5$ | Tr | 12 | 12 | 4 | 2 | 0 |
| C$_6$ | Tr | 46 | | 7 | 47 | 50 |
| C$_7$ | Tr | 10 | | 2 | 6 | 2 |
| C$_8$ | Tr | 44 | | 11 | 22 | 39 |
| C$_9$+ | Tr | 48 | | 50 | 40 | 22 |
| Total Alkylate (Depentanized) | | 148 | 157 | 70 | 115 | 113 |
| Ethylene Converted | | 88 | 72 | 73 | 74 | 69 |
| 2,3-Dimethylbutane in C$_6$ Product | | 90.2 | | | 92.4 | 92.1 |
| Wt. percent Fluoborate on Alumina | 20 | 20 | 16 | 16 | 17 | |

Thus having described the invention, what is claimed is:

1. An alkylation process wherein an isoparaffin having from 4 to 8 carbon atoms and an olefin having from 2 to 12 carbon atoms are contacted, in a molar ratio of isoparaffin to olefin between about 2 and 50, at a temperature between about 0° C. and 100° C. and a pressure at least sufficient to keep a substantial portion of said reactants in the liquid state, for a time sufficient to permit an appreciable amount of alkylation reaction to take place, in the presence of a catalyst comprising essentially a gel alumina containing between about 5 and 100 weight percent of a salt from the class consisting of zinc fluoborate and copper fluoborate, based on said alumina, and boron trifluoride, a product hydrocarbon mixture is removed from said contacting zone and an alkylate hydrocarbon product is separated from said mixture.

2. The process of claim 1 wherein said isoparaffin is isobutane.

3. The process of claim 1 wherein said isoparaffin is diisopropyl.

4. The process of claim 1 wherein said olefin is ethylene.

5. The process of claim 1 wherein said olefin is propylene tetramer.

6. The process of claim 1 wherein said temperature is between about 30° C. and 50° C.

References Cited in the file of this patent

UNITED STATES PATENTS 2,381,481   Anderson _____ Aug. 7, 1945

OTHER REFERENCES

Booth et al.: "Boron Trifluoride and Its Derivatives," pp. 207–209, John Wiley & Sons, Inc., New York, 1949.